(12) United States Patent
Friedrich

(10) Patent No.: US 10,544,570 B2
(45) Date of Patent: Jan. 28, 2020

(54) SYSTEM SEPARATOR

(71) Applicant: Honeywell Technologies Sarl, Rolle (CH)

(72) Inventor: Pierre Friedrich, Binau (DE)

(73) Assignee: Honeywell Technologies SARL, Rolle (CH)

( * ) Notice: Subject to any disclaimer, the term of this patent is extended or adjusted under 35 U.S.C. 154(b) by 161 days.

(21) Appl. No.: 15/663,156

(22) Filed: Jul. 28, 2017

(65) Prior Publication Data

US 2018/0030696 A1     Feb. 1, 2018

(30) Foreign Application Priority Data

Aug. 1, 2016  (DE) .................... 20 2016 104 221 U

(51) Int. Cl.
| E03B 7/07 | (2006.01) |
| E03C 1/10 | (2006.01) |
| E03C 1/02 | (2006.01) |
| F16K 15/06 | (2006.01) |

(52) U.S. Cl.
CPC .............. *E03B 7/077* (2013.01); *E03C 1/023* (2013.01); *E03C 1/106* (2013.01); *E03C 1/108* (2013.01); *B01D 2313/20* (2013.01); *F16K 15/06* (2013.01); *Y10T 137/87917* (2015.04)

(58) Field of Classification Search
CPC .......... E03B 7/077; E03C 1/106; E03C 1/108; Y10T 137/87917
USPC ....................................................... 137/613
See application file for complete search history.

(56) References Cited

U.S. PATENT DOCUMENTS

| 5,215,121 | A | * | 6/1993 | Michl ..................... E03C 1/106 |
| | | | | 137/614.2 |
| 5,363,875 | A | | 11/1994 | Vollmer |
| 5,960,818 | A | * | 10/1999 | Hecking ................. E03C 1/106 |
| | | | | 137/218 |
| 7,059,340 | B2 | | 6/2006 | Hecking |

FOREIGN PATENT DOCUMENTS

| DE | 4204386 A1 | 8/1993 |
| DE | 10308838 A1 | 9/2004 |
| DE | 202005020081 U1 | 3/2006 |
| DE | 202009016823 U1 | 4/2011 |
| DE | 202014001685 U1 | 4/2014 |

OTHER PUBLICATIONS

German Search Report for German Application DE 202016104221. 6, dated Apr. 12, 2017.

* cited by examiner

*Primary Examiner* — Kevin L Lee
(74) *Attorney, Agent, or Firm* — Shumaker & Sieffert, P.A.

(57) ABSTRACT

A pressure reducer for a system separator includes a seal element accommodated in a groove, which is subject on a first side to a pressure prevailing at an inlet-side connection stub of the system separator and on a second side to a pressure prevailing in an inlet chamber of the system separator. At least one recess is introduced into a wall delimiting the groove on the first side, into which recess the seal element partially enters, canceling out its sealing effect, when the pressure prevailing at the inlet-side connection stub falls below the pressure prevailing in the inlet chamber.

7 Claims, 4 Drawing Sheets

SYSTEM SEPARATOR

This application claims priority to German Utility Model Patent Application No. 20 2016 104 221.6, filed Aug. 1, 2016, which is incorporated herein by reference.

TECHNICAL FIELD

The invention relates to a system separator, sometimes referred to as a backflow preventer.

BACKGROUND

DE 42 04 386 C2 discloses a system separator having a housing, the housing of which defines an inlet chamber, an intermediate chamber and an outlet chamber, wherein the system separator furthermore has two backflow preventers positioned in the housing and arranged in series in the through flow direction of a medium, namely a first, inlet-side backflow preventer, arranged between the inlet chamber and the intermediate chamber, and a second, outlet-side backflow preventer, arranged between the intermediate chamber and the outlet chamber. The system separator disclosed there furthermore comprises a discharge valve, by means of which the intermediate chamber between the two backflow preventers can vent or be emptied, wherein the discharge valve is controlled in accordance with a differential pressure between the pressure in the inlet chamber and the pressure in the intermediate chamber. The discharge valve opens to connect the intermediate chamber to the atmosphere for air admission when this differential pressure falls below a defined limit value.

DE 20 2005 020 081 U1 discloses another system separator having an inlet-side backflow preventer arranged between an inlet chamber and an intermediate chamber, an outlet-side backflow preventer arranged between the intermediate chamber and an outlet chamber, and a discharge valve, wherein, according to this prior art, the housing of the system separator is designed as a two-part housing, which comprises a first, upper housing part and a second, lower housing part.

Via the first housing part, the system separator in DE 20 2005 020 081 U1 can be connected to a first line, in particular to a standpipe, or to an upstream pressure zone. The second housing part accommodates the two backflow preventers and serves to connect the system separator to a second line or to a downstream pressure zone. According to this prior art, the two housing parts of the housing of the system separator are screwed to one another, for which purpose the first, upper housing part has a section with an external thread and the second, lower housing part has a section with an internal thread, which engage in one another when screwed together.

Another system separator is known from DE 20 2009 016 823 U1, wherein a one-piece housing is provided in this system separator, and wherein the inlet chamber of the system separator is assigned a shutoff valve, by means of which the inlet chamber can be separated from an upstream pressure zone.

DE 20 2014 001 685 U1 discloses another system separator having a housing, wherein once again two backflow preventers and a shutoff valve are accommodated in the housing. It is furthermore already known from this prior art that a pressure reducer can be integrated into the housing upstream of the two backflow preventers, this pressure reducer then being arranged between an inlet-side connection stub of the housing and the inlet chamber of the inlet-side backflow preventer. The pressure reducer limits the pressure prevailing in the inlet chamber to a pressure level below the pressure at the inlet-side connection stub of the system separator.

In practice, it has been found that, when a pressure reducer is integrated into the system separator upstream of the two backflow preventers and when the pressure prevailing at the inlet stub falls below the pressure in the inlet chamber, the pressure reducer does not open and thus the pressure in the inlet chamber remains constant.

In this case, it is then not possible to empty the system separator by opening the discharge valve in the region of its intermediate chamber since, despite the fall in the pressure difference, decisive for this purpose, between the pressure at the inlet-side connection stub and the pressure in the intermediate chamber, the pressure difference between the inlet chamber and the intermediate chamber does not fall in a corresponding fashion.

SUMMARY

It is the underlying object of the invention to provide a novel system separator.

This object is achieved by a system separator as claimed in claim 1. By virtue of this embodiment of the pressure reducer integrated into the system separator in the region of the groove accommodating the seal element of the pressure reducer, it is possible to ensure that, when the pressure at the inlet-side connection stub falls below the pressure in the inlet chamber, the pressure in the inlet chamber follows the pressure at the inlet-side connection stub, with the result that reliable emptying of the intermediate chamber via the discharge valve is then possible. The functional reliability of the system separator is thereby increased.

A plurality of recesses is preferably introduced into the wall delimiting the groove on the first side, into which recesses the seal element partially enters, canceling out its sealing effect, when the pressure prevailing at the connection stub falls below the pressure prevailing in the inlet chamber. This embodiment is particularly preferred.

According to an advantageous development of the invention, the or each recess in the wall delimiting the groove on the first side is of secant-shaped design with a rectilinear boundary contour. This contouring of the respective recess is preferred for damage-free entry of the seal element into the recess.

According to an advantageous development of the invention, a wall which delimits the groove and which extends between the wall delimiting the groove on the first side and a wall delimiting the groove on the second side is contoured in such a way that a depth of the groove increases from the second side toward the first side. This contouring of the groove ensures that stress or pre-stress in the seal element is first of all reduced and said seal element can then enter partially into the or each recess in the relaxed state.

BRIEF DESCRIPTION OF THE DRAWINGS

Preferred developments of the invention will become apparent from the dependent claims and the following description. An illustrative embodiment of the invention is explained in greater detail below by means of the drawing, without being restricted thereto. In the drawing:

DESCRIPTION

The invention under consideration here relates to a system separator.

Figure 1:
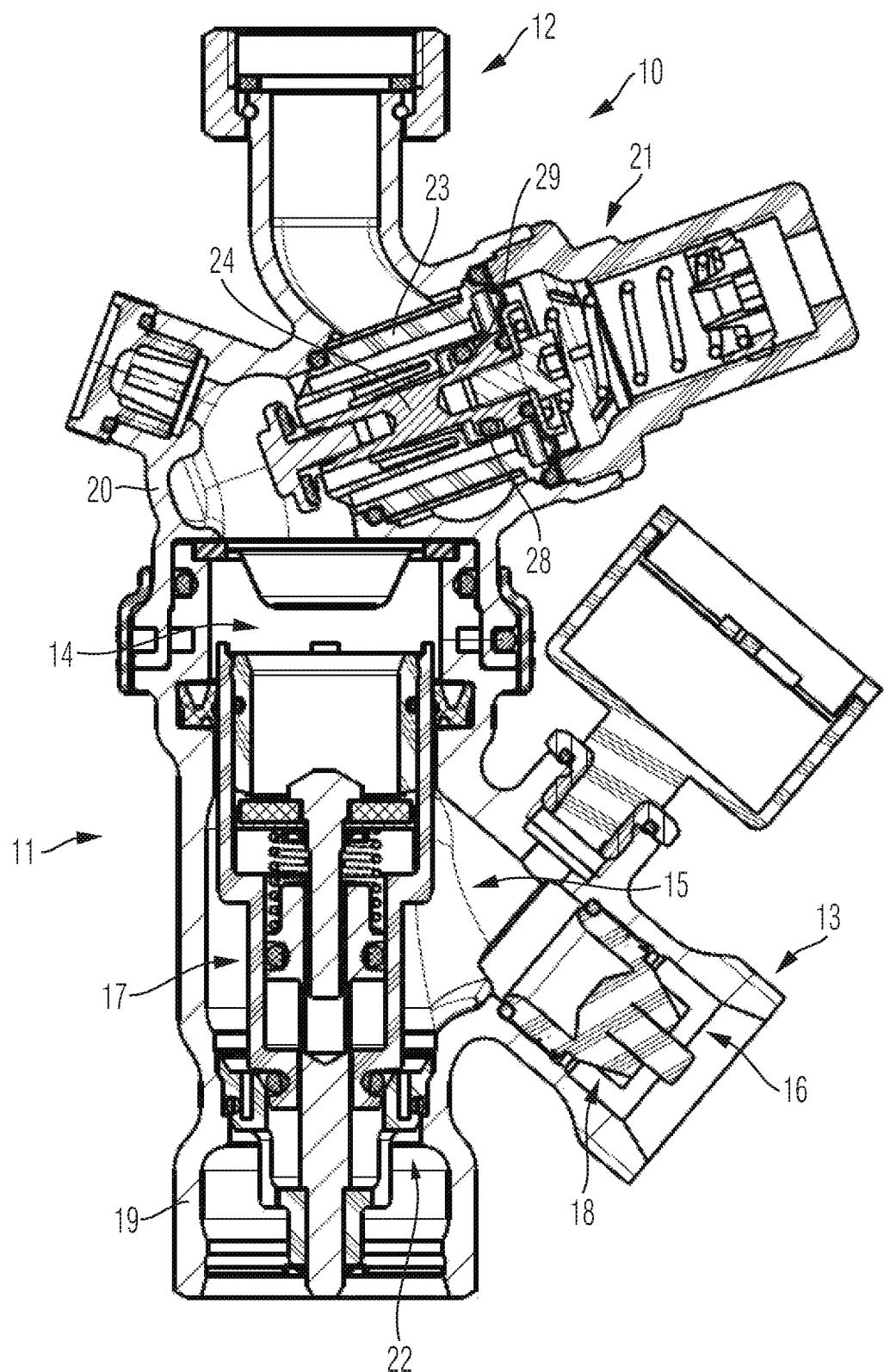
FIG. 1 shows a system separator according to the invention in cross section.

FIG. 1 shows a cross section through a preferred illustrative embodiment of a system separator 10 according to the invention. The system separator 10 has a housing 11, wherein the housing 11 provides an inlet-side connection stub 12 and an outlet-side connection stub 13. The system separator 10 can be connected to a drinking water supply line or upstream pressure zone via the inlet-side connection stub 12, wherein the system separator 10 can be coupled via the outlet-side connection stub 13 to a consumer-side drinking water line or downstream pressure zone.

Two backflow preventers 17, 18, namely an inlet-side backflow preventer 17 (e.g. inlet side check valve) and an outlet-side backflow preventer 18 (e.g. outlet side check valve), are accommodated in the housing 11 of the system separator 10 according to the invention. The inlet-side backflow preventer 17 is arranged between an inlet chamber 14, provided by the housing 11 of the system separator 10, and an intermediate chamber 15, likewise provided by the housing 11 of the system separator 10. The outlet-side backflow preventer 18 of the system separator 10 is arranged between the intermediate chamber 15 and an outlet chamber 16, which is likewise provided by the housing 11 of the system separator 10.

FIG. 1 furthermore shows a discharge valve 22. The discharge valve 22 is supposed to open automatically when a pressure difference between the pressure at the inlet-side connection stub 12, which corresponds to the pressure in the drinking water supply line, and a pressure in the intermediate chamber 15 is or becomes less than a predetermined limit value. This fundamental function of a system separator 10 is familiar to the person skilled in the art addressed here.

A pressure reducer 21 is furthermore integrated into the housing 11 of the system separator 10, wherein the pressure reducer 21 is arranged between the inlet-side connection stub 12 and the inlet chamber 14. The pressure reducer 21 reduces the pressure prevailing at the inlet-side connection stub 12 to a defined pressure level. The fundamental construction and fundamental mode of operation of a pressure reducer 21 of this kind are familiar to the person skilled in the art addressed here. The pressure reducer 21 has a tappet 24, which is guided in a guide 23 and carries a seal element 25. This tappet 24 is acted upon by the pressure prevailing at the inlet-side connection stub 12 in such a way that this pressure tends to press the seal element 25 of the tappet 24 against a sealing seat 26 of the guide 23. The guide 23 furthermore carries a diaphragm 27, to which the pressure prevailing in the inlet chamber 14 is applied.

In the illustrative embodiment shown, the housing 11 of the system separator 10 is of two-part design, namely a first housing part 19 and a second housing part 20, which are connected to one another. In the illustrative embodiment in FIG. 1, the two housing parts 19, 20 of the housing 11 of the system separator 10 are connected to one another in the manner known from DE 20 2014 001 685 U1. The two backflow preventers 17, 18 are accommodated by the first housing part 19, whereas the pressure reducer 21 is accommodated by the second housing part 20.

As already explained, the pressure reducer 21 reduces the pressure applied to the inlet-side connection stub 12 to a defined pressure level, with the result that the pressure in the inlet chamber 14 is limited to this pressure level. In order to ensure that, when the pressure applied to the inlet-side connection stub 12 falls below the pressure level in the inlet chamber 14, the pressure in the inlet chamber 14 follows the pressure at the inlet-side connection stub 12, and in order to ensure proper emptying of the intermediate chamber 15 when the pressure difference between the pressure at the inlet-side connection stub 12 and the pressure in the intermediate chamber 15 falls below a limit value, the pressure reducer 21 is designed in the manner described below.

Figure 2:
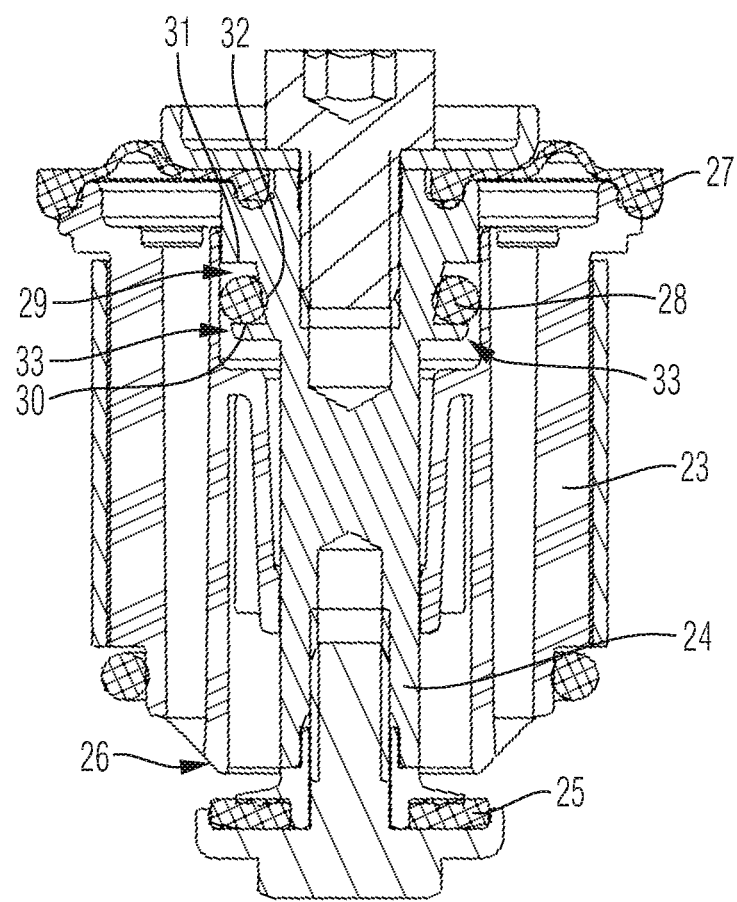
FIG. 2 shows a detail of the system separator in FIG. 1 in the region of a pressure reducer thereof.

From FIG. 2, it can be seen that the tappet 24 of the pressure reducer 21 is sealed with respect to the guide 23 by a seal element 28, which is accommodated in a groove 29 in the guide 23.

The pressure acting in the region of the inlet-side connection stub 12 is applied to this seal element 28 on a first side, at the bottom in FIG. 2.

The pressure prevailing in the inlet chamber 14 is applied to a second side of seal element 28, at the top in FIG. 2.

The groove 29 which accommodates seal element 28 is delimited by a plurality of walls, namely by a wall 30 delimiting the groove 29 on the first side, by a wall 31 delimiting the groove on the second side, and by a wall 32 extending between the walls 30, 31 on the first side and the second side.

At least one recess 33 is introduced into the wall 30 delimiting the groove 29 on the first side. When the pressure prevailing at the inlet-side connection stub 12 falls below the pressure prevailing in the inlet chamber 14, that is to say when the pressure prevailing on the first side of seal element 28 is lower than the pressure prevailing on the second side thereof, seal element 28 can be introduced partially into the respective recess 33, canceling out its sealing effect. Thus, when the pressure on the first side of seal element 28 is lower than the pressure on the second side thereof, seal element 28 partially enters the or each recess 33 in the wall 30 delimiting the groove 29 on the first side, canceling out its sealing effect.

In the preferred illustrative embodiment shown, a plurality of diametrically opposite recesses 33, namely two recesses, is introduced into the wall 30 delimiting the groove 29 on the first side, wherein these recesses 33 are of secant-shaped design with a rectilinear boundary contour 34. The essentially circular wall 30 delimiting the groove 29 on the first side is accordingly interrupted by two secant-shaped recesses with rectilinear boundary contours 34 to form the recesses 33.

Those points of a rectilinear, secant-shaped boundary contour 34 at which the respective boundary contour 34 intersects the essentially circular contour of wall 30 delimit an angular range over which the respective recess 33 extends, wherein this angular range is between 45° and 135°, in particular between 60° and 120°.

This angular range of the respective recess 33 is enclosed by two straight lines, wherein one of the straight lines in each case extends through one of the respective points of intersection of the respective rectilinear, secant-shaped boundary contour with the essentially circular contour of wall 30 and the central point of the essentially circular contour of wall 30. The two rectilinear, secant-shaped boundary contours 34 of the two recesses 33 are parallel to one another.

To facilitate entry of seal element 28 into the or each recess 33 when the pressure prevailing at the inlet-side connection stub 12 falls below the pressure in the inlet chamber 14, it is envisaged that the wall 32 which delimits the groove between walls 30 and 31 tapers from the second side toward the first side. In the region of the second side or of the wall 31 extending on the second side, wall 32 accordingly has a larger diameter than in the region of the first side or of the wall 30 positioned on the first side. From this it follows that a depth of the groove 29 increases from the second side toward the first side.

Figure 3:
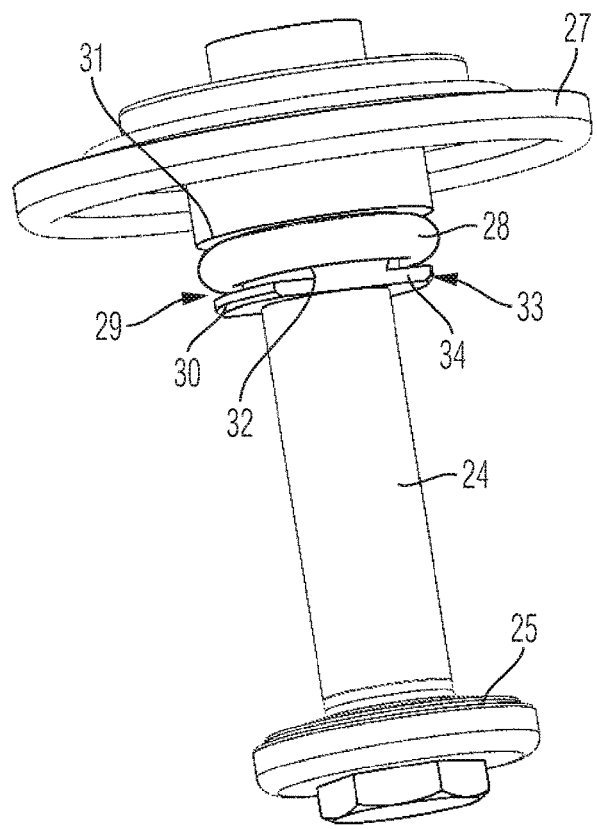
FIG. 3 shows a detail of the pressure reducer in a first state thereof.
Figure 4:
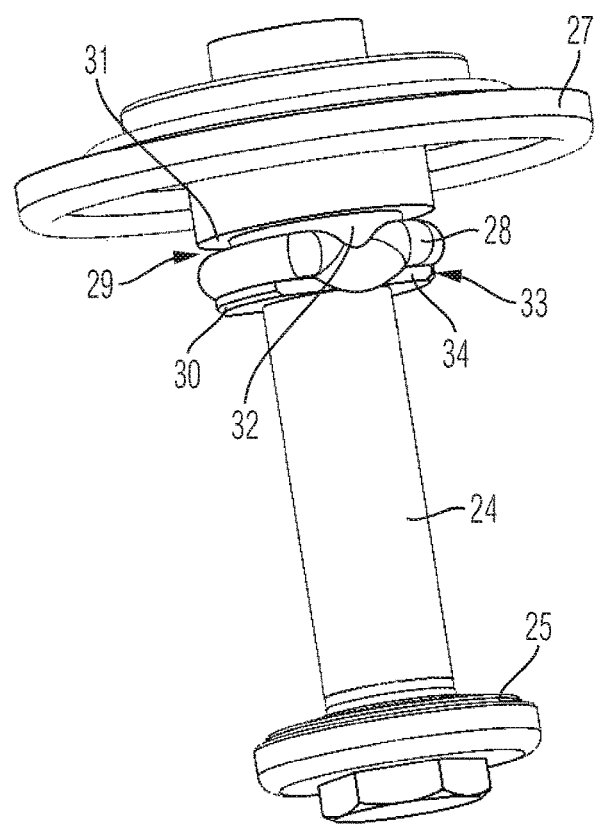
FIG. 4 shows the detail in FIG. 3 in a second state thereof.
Figure 5:
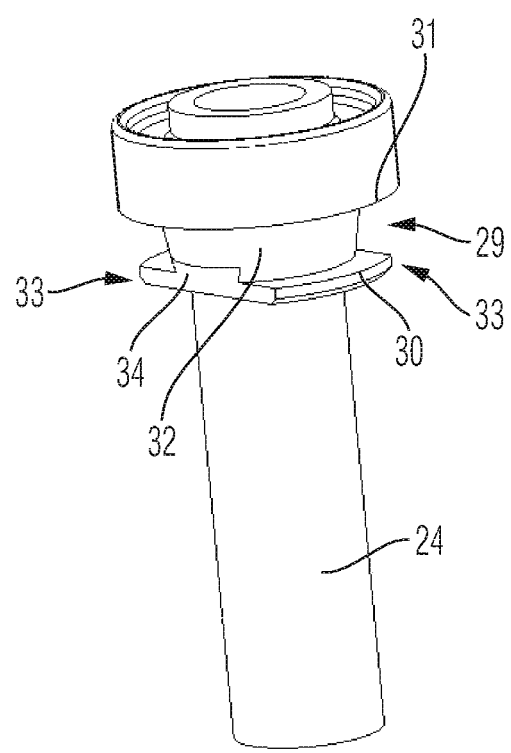
FIG. 5 shows another detail of the pressure reducer.

When the pressure which prevails at the inlet-side connection stub 12 and accordingly is applied to the first side of seal element 28 is higher than the pressure which prevails in the inlet chamber 14 and is applied to the second side of seal element 28, seal element 28 is pressed into the position shown in FIG. 3, against the wall 31 delimiting the groove on the second side, and, in the process, is pre-stressed in the region of wall 32. In contrast, when the pressure which prevails at the inlet-side connection stub 12 and is applied to the first side of seal element 28 decreases, seal element 28 is pressed into the position shown in FIG. 4, starting from the position shown in FIG. 3, during which process seal element 28 initially slides along the tapered contour of wall 32 and, as it does so, relaxes owing to the decreasing diameter of wall 32 and to the increasing depth of the groove 29.

If there is a further pressure reduction in the region of the inlet-side connection stub 12 and accordingly a greater pressure difference between the pressure at the inlet-side connection stub 12 and the pressure in the inlet chamber 14, a section or region of seal element 28 is pressed into the or each recess 33 and, in the process, loses its sealing effect. As a result, the pressure in the inlet chamber 14 can then follow the pressure at the inlet-side connection stub 12.

If the pressure applied to the inlet-side connection stub 12 falls to the extent that a pressure difference between the pressure at the inlet-side connection stub 12 and the pressure in the intermediate chamber 15 falls below a limit value, the discharge valve 22 can then open without problems and vent to the intermediate chamber 15 since the pressure prevailing at the inlet-side connection stub 12 is then also applied in the inlet chamber 14. Jul. 28, 2017.

LIST OF REFERENCE SIGNS 10 system separator
11 housing
12 inlet-side connection stub
13 outlet-side connection stub
14 inlet chamber
15 intermediate chamber
16 outlet chamber
17 inlet-side backflow preventer
18 outlet-side backflow preventer
19 first housing part
20 second housing part
21 pressure reducer
22 discharge valve
23 guide
24 tappet
25 seal element
26 sealing seat
27 diaphragm
28 seal element
29 groove
30 wall
31 wall
32 wall
33 recess
34 boundary contour

What is claimed is:

1. A system separator comprising:
   a housing, which has an inlet-side connection stub and an outlet-side connection stub and which defines an inlet chamber, an intermediate chamber and an outlet chamber;
   backflow preventers positioned in the housing and arranged in series in a through flow direction of a medium, the backflow preventers comprising a first, inlet-side backflow preventer, arranged between the inlet chamber and the intermediate chamber, and a second, outlet-side backflow preventer, arranged between the intermediate chamber and the outlet chamber;
   a discharge valve, which vents the intermediate chamber between the backflow preventers and which is controlled in accordance with a differential pressure between a pressure in the inlet chamber and a pressure in the intermediate chamber;
   a pressure reducer, which is positioned in the housing and, in the through flow direction of the medium, is arranged ahead of the backflow preventers between the inlet-side connection stub and the inlet chamber, wherein the pressure reducer has a seal element accommodated in a groove, which is subject on a first side to a pressure prevailing at the inlet-side connection stub and on a second side to a pressure prevailing in the inlet chamber; and
   at least one recess introduced into a wall delimiting the groove on the first side, into which recess the seal element partially enters, canceling out its sealing effect, when the pressure prevailing at the inlet-side connection stub falls below the pressure prevailing in the inlet chamber.

2. The system separator as recited in claim 1, wherein a plurality of recesses are introduced into the wall delimiting the groove on the first side, into which recesses the seal element partially enters, canceling out its sealing effect, when the pressure prevailing at the inlet-side connection stub falls below the pressure prevailing in the inlet chamber.

3. The system separator as recited in claim 2, wherein at least two recesses are introduced at two diametrically opposite positions into the wall delimiting the groove on the first side, into which recesses the seal element partially enters, canceling out its sealing effect, when the pressure prevailing at the inlet-side connection stub falls below the pressure prevailing in the inlet chamber.

4. The system separator as recited in claim 3, wherein each of the at least two recesses extends over an angular range of between 45° and 135°.

5. The system separator as recited in claim 4, wherein each of the at least two recesses extends over an angular range of between 60° and 120°.

6. The system separator as recited in claim 1, wherein each recess of the at least one recess is of secant-shaped design with a rectilinear boundary contour.

7. The system separator as recited in claim 1, wherein a wall, which delimits the groove and which extends between the wall delimiting the groove on the first side and the wall delimiting the groove on the second side, is contoured in such a way that a depth of the groove increases from the second side toward the first side.

* * * * *